Dec. 22, 1953　　　　W. VANDERMEER　　　　2,663,374
HELICOPTER ROTOR CONTROL MECHANISM

Filed March 22, 1949　　　　　　　　　　　2 Sheets-Sheet 1

Will Vandermeer
　　　*INVENTOR.*

BY *Dame M. Clark*
HIS PATENT ATTORNEY

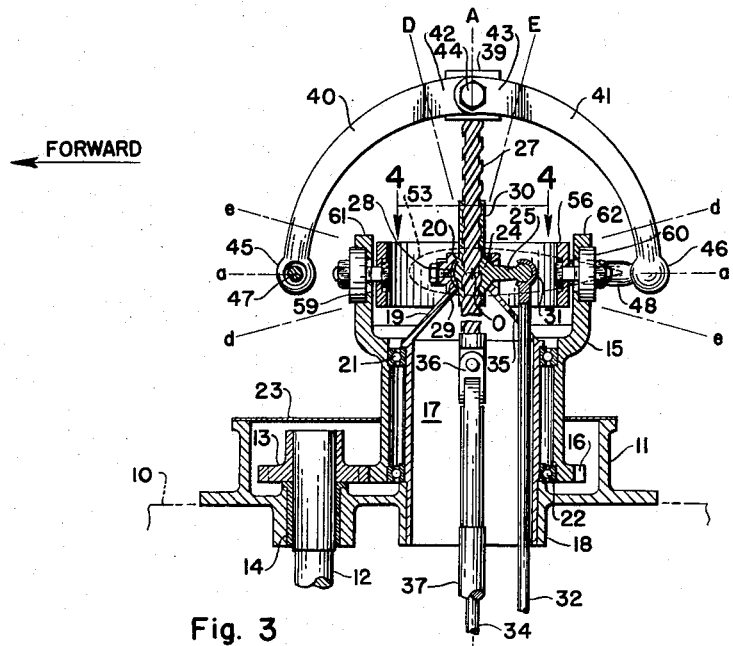

Patented Dec. 22, 1953

2,663,374

UNITED STATES PATENT OFFICE 2,663,374

HELICOPTER ROTOR CONTROL MECHANISM

Will Vandermeer, San Diego, Calif., assignor to The Ryan Aeronautical Co., San Diego, Calif., a corporation of California Application March 22, 1949, Serial No. 82,863

15 Claims. (Cl. 170—160.26)

The present invention relates to rotative wing aircraft and more particularly to improved control mechanism for helicopters and similar direct lift aircraft.

It has frequently been customary in the design of mechanisms for controlling the pitch angle of the blades of a helicopter or other rotors to utilize a rotating element commonly referred to as a swash plate to obtain control variations in the cyclic pitch of the blades, as well as to provide means for raising or lowering the rotor hub for the blades in order to increase or decrease the pitch on each of the blades simultaneously, which latter control is usually referred to as the collective pitch control. The present invention is directed to improvements and simplifications of the usual cyclic and collective pitch control mechanisms wherein the use of the customary swash plate has been eliminated and an improved mechanism provided which accomplishes the control of both the cyclic and the collective pitch of the rotor blades in a much simpler and more effective manner.

A common difficulty with most prior helicopter control mechanisms has been the tendency of the craft when started in a forward or other horizontal direction from a hovering condition, to also start to climb at the same time. In other words, when a helicopter is hovering at a certain altitude and the cyclic pitch control is moved in order to accomplish forward movement, the craft automatically starts climbing at the same time that it begins to move forward. Accordingly, in order to maintain the same altitude in present helicopters having such controls, the collective pitch control must also be adjusted or reduced simultaneously as the cyclic pitch control is adjusted for the forward motion. In a further improved form of the present control mechanism the necessity of readjusting the collective pitch control in case the cyclic pitch has been changed has been eliminated, and the corrective adjustment of the collective pitch is accomplished automatically. The cyclic pitch control mechanism in this further modification however may be identical with that shown and described in connection with the initial modification.

It is, accordingly, a major object of the present invention to provide an improved control mechanism for a helicopter rotor. It is a further objective to provide an improved helicopter rotor blade control mechanism which avoids the necessity of providing swash plates or the like. It is a still further object to provide improved control mechanism for rotor blades for controlling both cyclic and collective pitch adjustments of the blades by a more simplified and effective mechanism which avoids the necessity of raising or lowering the hub assembly which supports the rotor blades. A still further object of the present invention resides in the provision of an improved rotor blade hub mounting and pitch control mechanism by means of which improved operation and control of the helicopter in flight is obtained without the necessity of operating a second control in order to correct for the adjustment of a first control.

Other objects and advantages of the present invention will become apparent to those skilled in the art after reading the following description taken in conjunction with the accompanying drawings forming a part hereof in which:

Fig. 3 is a sectional elevation of the same mechanism as taken along the lines 3—3 of Fig. 2;

Fig. 5 is an enlarged partly sectioned detail view of the upper ball joint through which the pitch of the rotor blades is adjusted; and Fig. 6 is a sectional elevation of a modified form of the control mechanism shown in the previous figures.

Figure 1:
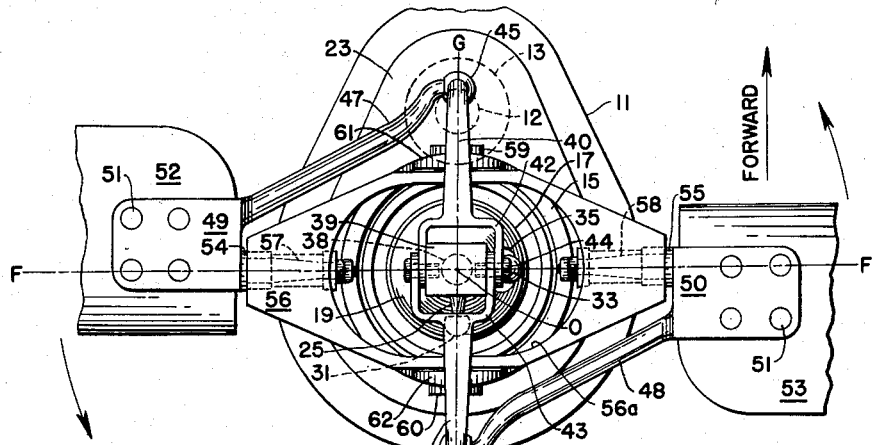
Fig. 1 is a plan view of an improved form of the present invention as applied to a two-bladed helicopter rotor.
Figure 2:
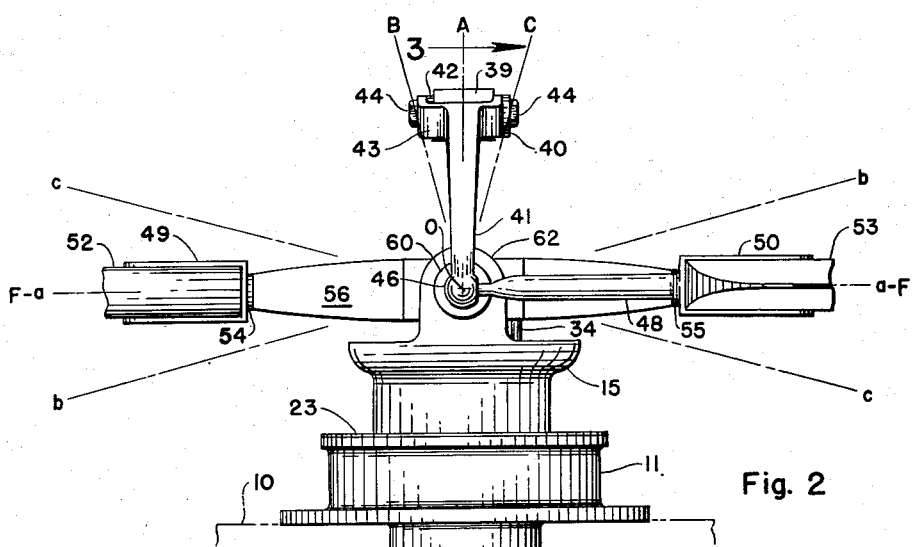
Fig. 2 is an elevational view of the blade mounting and pitch control mechanism shown in Fig. 1.

Referring now to Figs. 1, 2 and 3, the numeral 10 represents the upper deck or top portion of the structural frame-work of a helicopter fuselage to which the flanged rotor head member 11 is securely fastened. In Figs. 1 and 2, the nose of the helicopter, or the forward direction is located at the top of the drawing in the case of Fig. 1, or away from the reader in Fig. 2. In the sectional elevational view of Fig. 3, the forward direction is toward the reader's left as indicated and the control mechanism is being viewed looking toward the right side of the machine. In this latter figure, the numeral 12 indicates the drive shaft which is suitably connected by conventional transmission mechanism to the power source for driving the rotor. The vertical drive shaft 12 has a drive pinion 13 suitably keyed or otherwise fastened to its upper terminal which is journalled in the bushed portion 14 of the rotor head base member 11. A cylindrical hub or drum member 15 is provided with an integral gear 16 at its lower extremity, the teeth of which mesh with those of the drive pinion 13 for rotatively driving the member 15 about the normal vertical axis of the rotor A—A. Concentrically disposed within the rotating hub member 15 is a fixed post member 17 which is fastened and supported from the sleeve portion 18 on the base member 11. The fixed cylindrical post member 17 is provided with a conic top portion 19 which terminates in a socket portion 20 at the top of the member. The concentrically disposed members 15 and 17 are suitably shouldered to provide for the anti-friction bearings 21 and 22 which permit the rotatable gear drum member 15 to be rotated about the vertical axis A—A and with respect to the relatively fixed rotor head base member 11 and its fixed post member 17. A suitable cover plate 23 is provided above the gearing within the base member 11, being readily removable for access in servicing and lubricating the bearings and gearing within the base member.

The socket portion 20 is provided with a spherical recess concentrically disposed about the center point O which is the center of the ball fitting 24 as well as of the entire hub assembly. The latter is provided with radially extending arm portions 25 and 26 extending at right angles to each other. In the present modification one extends to the right of the aircraft and the other extends toward the rear, for the desired cyclic pitch adjustment of the rotor blades. The interior, or internal bore, of the ball fitting 24 is threaded to receive and to be threadedly engaged by the screw rod 27 provided with a steep pitch thread extending substantially throughout its vertical length. The socket portion 20 is preferably tapped to receive a threaded pin 28 engaging a vertical arcuate groove 29 provided within the surface of the ball fitting 24. This pin and groove arrangement prevents relative rotation between the fixed socket portion 20 and the ball fitting 24, while at the same time permitting the latter to be tilted in any direction about the center O within the angular limits provided by the socket portion 20. The ball portion 24 is provided with an upwardly extending interiorly threaded sleeve portion 30 which serves to increase the length of the threaded engagement of the ball fitting 24 with the screw rod 27 and may also serve as a limiting stop to define the relative axial movements between the screw rod 27 and the ball fitting 24.

Figure 4:
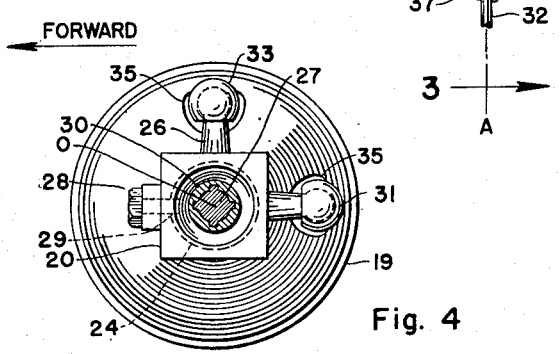
Fig. 4 is an enlarged sectional plan view as taken along the lines 4—4 of Fig. 3.

As more clearly shown in Figs. 3 and 4, the ball portion arms 25 and 26, which extend rearwardly and to the right of the aircraft respectively, are provided with ball terminals 31 and 33 which form the upper terminals of the cyclic pitch control rods 32 and 34 at the rear and right side of the vertical axis A—A, respectively. The cyclic pitch control rods 32 and 34 extend through openings 35 provided within the conic top portion 19 of the fixed post member 17.

The lower terminal of the screw rod 27 is connected to a universal joint 36 which has been indicated diagrammatically in the drawings, and is preferably of the constant angular velocity type. The universal joint is in turn connected to the vertically disposed control rod 37 which is connected at its lower end to a suitable control member accessible to the pilot for rotation to adjust the collective pitch of the rotor system. The upper end of the screw rod 27 terminates in a ball portion 38 which is rockably supported within the socket fitting 39, the details of which are more clearly shown in Fig. 5. An arcuate pitch control arm 40 is provided with a bifurcated upper terminal 42 embracing the socket fitting 39 and pivotally mounted thereupon by the pivot bolts 44. A substantially identical arcuate control arm 41 is oppositely disposed with respect to the vertical axis A—A and is in turn provided with a bifurcated terminal 43 which is pivotally mounted, together with the like terminal 42 of the opposite control arm 40, to the socket fitting 39 by the same pivot bolts 44. The lower outer terminal of the pitch arm 40 is provided with a ball terminal 45 which is flexibly connected to the blade bracket 47, in turn terminating in a bifurcated portion 49 attached to the left rotor blade 52 as by the fastenings 51 shown in Fig. 1. The corresponding outer lower terminal of the pitch arm 41 is similarly provided with a ball joint 46 which is flexibly connected to the blade bracket 48 attached through its bifurcated portion 50 to the right rotor blade 53 by the fastenings 51.

The left rotor blade 52 is provided with a hinge spar 54 coaxially mounted upon the axis of rotation for blade pitch change indicated by the axis F—F in Fig. 1 and the opposite blade 53 is provided with a correspondingly disposed spar hinge 55. The blade hinge axis F—F always passes through the center O whether horizontally coinciding with axis $a$—$a$ of Fig. 2 or tilted like the axes $b$—$b$ and $c$—$c$ of this figure. The spar hinges 54 and 55 terminate in a yoke fitting 56 having a central aperture 56a to provide adequate clearance around the screw rod 27 as the plane of the rotor blades may be tilted with respect to the vertical axis of rotation A—A. The yoke member 56 is connected intermediate the spar hinges 54 and 55 by the bearings 57 and 58, which permit relative rotation of the blades about their common axis F—F for blade pitch changes. At the same time, however, the assembly creates a rigid rotor system by maintaining the transverse alignment of the spar hinges coincident with the axis F—F, being designed to adequately withstand the bending moments created by the upward lift forces on each of the blades 52 and 53. The sides of the yoke member 56 are provided with bores along the axis G—G extending fore and aft transverse to F—F as indicated in Fig. 1, which bores are engaged by the yoke pivots 59 and 60 supported within the upstanding boss portions 61 and 62 of the drum head fitting 15. It is, accordingly, through these pivot bearings 59—61 and 60—62 that the lifting forces created by the rotating blades 52 and 53 are transmitted to the drum head fitting 15 and thence through the thrust type anti-friction bearings 21 and 22 to the fixed post and base members 17 and 11, respectively. It will, accordingly, be seen that from the neutral position shown in the full lines in Figs. 1 to 4, inclusive, the collective or overall pitch of the blades may be adjusted by rotation of the control rod 37, or the cyclic pitch of the rotor blades may be adjusted by vertical movement of either or both of the cyclic pitch push-pull rods 32 and 34.

It will be seen by reference to Fig. 3 how the collective pitch adjustment is accomplished by rotation of the control rod 37. Assuming that it is desired to increase the collective pitch on both of the blades, simultaneously as the word "collective" implies (only the far blade 53 being shown in dotted lines in this figure), the control rod 37 is rotated in the clockwise direction, looking downwardly, and the effect of rotating the screw rod 27 through the universal joint 36 serves to reduce the distance between the center O of the ball and socket 20—24 and the center of the upper ball fitting 39. This causes lowering of the ball terminals of the pitch arms 40 and 41 which in turn, through the blade brackets 47 and 48, lower the trailing edges of the blades and cause their collective pitch adjustments to be increased simultaneously. Conversely, when it is desired to reduce the collective pitch adjustment of the blades, the control rod 37 is rotated in the opposite direction, or counterclockwise as viewed from from above as in Fig. 1, causing greater vertical separation between the ball-and-socket 20—24 and the ball-and-socket 39, to thereby raise the blade trailing edges and reduce the collective pitch settings. Thus by raising or lowering the respective arms and blade brackets, both in the same direction, the angle of attack of both blades is decreased or increased, and accordingly the overall lift of the rotor system is correspondingly decreased or increased.

In order to cause the helicopter to move forward or sidewise, the axis of the screw shaft 27 is tilted either forward or sidewise by vertical movement of the push-pull rod 32 or 34 which results in changing the angle of attack of the blades along the path of each cycle of rotation, leaving the average pitch setting the same. This has the effect of gradually increasing and decreasing the angle of attack of the blades during the cycle and is, accordingly, referred to as the cyclic pitch change, or control. In other words, if it is desired to cause the helicopter to move forwardly the rear cyclic pitch control rod 32 is pushed upwardly causing the axis of the screw shaft 27 to be tilted forwardly along the axis D—O in Fig. 3, the plane of rotation of the rotor at the same time being defined by the axis $d$—$d$ shown in this same figure. Similarly, if it is desired that the helicopter be moved rearwardly, the rear rod 32 is pulled downwardly causing the screw shaft 27 to assume a rearwardly tilted attitude such as is indicated by the axis E—O and the plane of rotation of the blades defined as by the lines $e$—$e$. Upon return of the control rod to its neutral position, the screw shaft 27 again becomes aligned with the vertical axis A—A and the plane of rotation of the blades, or the rotor disc plane, will again be defined as by the horizontal axis $a$—$a$.

Similarly, the helicopter may be moved sidewise or laterally by corresponding movement of the push-pull rod 34 located to the right of the vertical axis A—A, to thereby change the cyclic pitch to the desired extent in the required direction. As the push-pull rod 34 is moved upwardly the right rotor 53 is raised as the left rotor 52 is lowered and the rotor may be caused to assume the tilted axis of rotation B—O with the plane of rotation indicated by the lines $b$—$b$ passing through the center O. This tilting of the rotor disc downwardly on the left side causes the machine to be moved to the left as the result of the change in the angle of attack of the blades along the path of each cycle, leaving the average pitch the same. Similarly, if it is desired to move the machine toward the right, the control rod 34 is moved downwardly such that the blades rotate about the inclined axis C—O and the blades rotate within the tilted plane defined by the lines $c$—$c$ passing through the center O. It will, accordingly, be seen that with the disclosed mechanism the collective pitch control and the cyclic pitch control are maintained entirely independent of each other. In other words, when the cyclic pitch control is moved, the collective pitch is not affected, and vice versa.

It is generally known that when a helicopter is hovering at a certain altitude and the cyclic pitch is adjusted in order to accomplish forward motion, the craft automatically starts climbing at the same time. This means that in order to maintain the same altitude the collective pitch control is also necessarily reduced or adjusted. In the modification which has been shown in Fig. 6, the necessity of readjusting the collective pitch control is eliminated when the cyclic pitch control has been changed. The mechanism shown in Fig. 6 differs from the modification shown in the earlier figures only in respect to the means for actuating and retaining the collective pitch control adjustments and the cyclic control features of the earlier modification is left identical in the modified mechanism.

In the modification of Fig. 6, the fuselage structure and skin covering is indicated at 63, upon which the base member 64 is secured and within which the vertical drive shaft 65 carrying the drive pinion 66 is journalled within the bushed journal or bearing 67. A cylindrical drum member 68 having the gear 69 integrally formed thereon is rotatably mounted about the post member 70 fixed to the sleeve 71 of the member 64. The post member 70 is provided with a conic top portion 72 terminating in the socket fitting 73 having its center at the point O. The post member 70 is suitably shouldered to provide for the thrust bearings 74 and 75, about which the gear drum 68—69 is arranged to rotate, and to transmit the lifting loads from the rotor to the post member and to the helicopter structure, a cover plate 76 being fastened to the member 64 to cover the gearing in this portion of the rotor drive. A ball fitting 77 having radially extending arms, the arm 78 of which extends rearwardly, and the laterally extending arm not being shown in this figure, for tilting of the rotor for cyclic pitch adjustment. The ball member 77 has an upwardly extending sleeve 81 which together with the ball is bored to permit the cylindrical actuating rod 80 to be slidably passed therethrough for collective pitch adjustment. A ball terminal 82 engages the arm 78 and is secured to the upper end of the actuating rod 83 to the rear of the axis A—A, and a like rod 84 is similarly attached to the arm which extends to the right of the same vertical axis, holes 85 being provided in the conic top 72 to permit passage of the rods therethrough.

The lower end of the rod 80 is attached to a universal joint 86 which in turn is connected to the push-pull control rod 87 for the collective pitch control. The only difference in the structure which has been described thus far with respect to the earlier modification is that the rod 80 corresponding to the screw rod 27 is not threaded and is merely pushed upwardly or drawn downwardly through the ball member 77 for collective pitch adjustment; and the rod 87 is similarly moved rectilinearly, rather than being rotated for adjustment of collective pitch control as in the case of the rod 37. The latter is provided with a spline, slip-joint or other lost-motion means below the universal 36, whereas the rod 87 is fixed in length and all the slipping due to tilting is done between the center O and the block 88. The rod 80 terminates in a similar block 88, as the ball-and-socket shown in Fig. 5, and the pitch arms 89 and 90 are pivotally mounted at their bifurcated terminals 91 and 92 to the block 88 by means of the transverse pivot bolts 93. The lower terminals of the pitch arms 89 and 90 are provided with ball terminals 94 and 95 which are connected respectively to the far or right rotor blade 98 by the blade bracket 96, and to the near or left blade, not shown, by the blade bracket 97 for which only the terminal portion is shown sectioned in Fig. 6. As in the case of the earlier modification, the two opposed blades in the mechanism shown in Fig. 6 are interconnected by a similar yoke member 99 which is pivotally mounted upon the pivot pins 100 and 101 provided within the boss portions 102 and 103 of the driven gear drum member 68—69.

It will be noted that the arrangement of the connections to the blades is opposite in Fig. 6 to that shown in Fig. 3, in other words in the earlier modification the rear pitch arm 41 was connected to the far or right blade 53 and as the axis of the pivot 44 was moved upwardly the arm 41 raised the trailing edge of the blade 53, thereby reducing its cyclic pitch. On the other hand, as the rod 80 is extended upwardly and the pivot bolt 93 moves correspondingly upward, the pitch arm 89 which is now attached to the far blade 98 is attached ahead of its leading edge, such that as the pitch arm 89 is raised the collective pitch of the blade 98 is also raised. Inasmuch as the rear pitch arm 90 is also connected forward of the near blade (not shown) the pitch of the latter will also be increased to the same extent as the rod 80 is moved upwardly. In other words, the collective pitch shaft 80, instead of being controlled by rotating in a threaded relationship as in Fig. 3, will be operated in an up and down sliding movement without rotation.

The means for providing this rectilinear collective control movement and for maintaining the controlled position is shown in Fig. 6. The numeral 104 indicates a bell-crank, which is pivotally mounted by a bracket 105 to fixed structure, having a pivotal connection 106 about which it may be rotated. One terminal of the bell-crank 104 is connected to the lower terminal of the control push-rod 87 and its other terminal to a push-pull rod 107. The rear or opposite terminal of the push-pull rod 107 is pivotally connected to a collective pitch control lever 108 at the pivot 112. The lever 108 is pivotally mounted at 109 to a bracket 114 mounted upon fixed structure and at its upper terminal is provided with a releasing grip portion 110 which may be selectively engaged or disengaged from an arcuate sector 111 provided with teeth 113. With the setting shown in this figure, the collective pitch is at the mean or normal adjustment, and as the lever 108 might be moved forwardly into the low collective pitch position, the rod 107 and the bell-crank 104 causes the control 87 to be pulled downwardly with a corresponding movement of the axis of the pivot bolts 93 thereby lowering the leading edges of both rotor blades and reducing the collective pitch to the desired degree.

It will be noted that in Fig. 6 the cyclic pitch control has been adjusted by rearward tilting of the rotor for rotation about the axis E—O with the plane of rotation of the rotor indicated by the lines e—e passing through the center O. The collective pitch setting is, as indicated above, at a substantially mean intermediate position and value, and is such that with the cyclic pitch setting shown and the rotor driven at the required speed, the helicopter would be moving backward horizontally at a certain given altitude. With a conventional machine flying either forward or rearward in this manner at same level or altitude, and it were desired to stop the machine and hover at a given point at that same altitude by bringing the cyclic pitch control into the neutral position, the conventional craft would start sinking when its horizontal movement was stopped and it would be necessary to adjust the pitch at a lower hovering altitude if the collective pitch shaft was kept in the same position. However, in the mechanism which has been shown in this Fig. 6, by moving the cyclic pitch control to its neutral position, due to maintaining the lower terminal of the control rod 87 at the same fixed position, the collective pitch is automatically increased by the straightening out and the lengthening of the distance between the ends of the combined control rods 80 and 87, which causes the axis of the upper pivot pins 93 to be moved upwardly farther away from the center O of the ball-and-socket connection 73—77, as the rotor is tilted forwardly to the vertical, neutral position upon the axis A—A with the rotor disc defined by the horizontal plane a—a. The same result is obtained when the rotor is returned from the axis D—O and the plane d—d to prevent loss of altitude and conversely when adjusted from hovering to travel in any direction, inadvertent climbing of the machine is automatically prevented. Accordingly, when bringing the helicopter provided with the mechanism of Fig. 6 to a stop while moving in any direction, i. e., forwardly, rearwardly or laterally and where it is desired to maintain the same altitude at which the machine is moving, the collective pitch setting is maintained in its latched or locked position and it is merely necessary to bring the cyclic pitch control back to its neutral position. This, accordingly, eliminates the necessity of providing an additional collective pitch adjustment after the machine has climbed or dropped in order to provide hovering at a desired position. Or in other words, the improved mechanism provides an automatic means for increasing or decreasing the collective pitch to the desired corrective extent to maintain horizontal flight in any of these flight maneuvers.

It will, accordingly, be noted that in both of the modifications shown and described above, the two oppositely disposed rotor blades form a rigid type rotor which supports the fuselage or body through the transverse axes of the blade hinge pivots and the yoke pivots at the center O, upon the substantially vertical axis of rotation, which point O becomes the virtual point of support of the body. The rotor is rigid in that the blades are not individually hinged about separate axes, but resist bending as a single continuous beam being adjustable only for pitch change about their common transverse spar axis. The body is, accordingly, flexibly or universally supported from this virtual point of support by means of the flexible ball-and-socket connection centered about the point O and about which the rotating assembly is tilted by the control rods to obtain the desired cyclic pitch adjustment of the blades as they are rotatively driven about the tilted axis. The flexible support of the body provides for a machine having a high degree of stability and one which is not susceptible to tipping or upsetting due to gusts or other disturbing forces. As pointed out above, the cyclic pitch control mechanism is substantially identical in both of the modifications which have been illustrated. The collective pitch control is accomplished in each modification by the provision of extensible means passing through the central portion of the ball concentrically with its center O and causing the upper ball-and-socket member center to be moved outwardly or inwardly with respect to the virtual point of support center O, to obtain the desired collective pitch control. It is in this collective pitch control mechanism that the modifications differ, as explained above, in that rotation of the screw jack in the first modification causes a positive change in the distance between the centers of the ball-and-socket assemblies which is retained during all positions of cyclic pitch adjustment, whereas in the improved modification the lower end of the control rod may either be moved for manual collective pitch adjustments or may be retained at a fixed position at which it causes the distance between the centers of the two ball-and-socket assemblies to be automatically and correctively adjusted for each new cyclic pitch setting.

Other forms and modifications of the present invention which will become apparent to those skilled in the art after reading the foregoing description are intended to come within the scope and spirit of the present invention as more particularly set forth in the appended claims.

I claim:

1. In an aircraft, a body, a driven member mounted upon said body for rotation about a generally vertical axis, a lifting rotor having blades pivotally mounted upon said member for blade pitch adjustment about a transverse axis, said rotor also being pivotally mounted upon said member for tilting adjustment about the intersection of said vertical and transverse axes, control means including a ball-and-socket assembly supported from said body and operating mechanism cooperatively connecting said assembly with said rotor for adjusting said rotor blades about said transverse axis for collective pitch control of said rotor blades and cyclic pitch control mechanism including vertically translatable push-pull means operatively connected to said control means for tilting adjustment of said assembly for the cyclic pitch control of the blades of said rotor.

2. In an aircraft, a body, a supporting member mounted upon said body for rotation about a generally vertical axis, a rotor having at least two opposed blades and an intermediate yoke member pivotally mounted upon said supporting member and pivotally mounting said rotor blades for tilting adjustment of said rotor axis with respect to said generally vertical axis, said blades mounted upon a transverse axis intersecting said generally vertical axis, a ball-and-socket assembly having its center disposed at the intersection of said transverse axis with said generally vertical axis, the socket element of said assembly being fixedly supported from said body and said ball element tiltably supported therein, said ball element having internal threads, blade pitch actuating mechanism including a rotatable screw jack in engagement with said ball element threads and link elements pivotally interconnected to said screw jack and to each said blade, and manual means for rotating said screw jack for adjusting said actuating mechanism toward and away from the center of said ball-and-socket assembly for the collective pitch adjustment of said rotor blades.

3. In an aircraft, a body, a supporting member mounted upon said body for rotation about a generally vertical axis, a rotor having at least two opposed blades pivotally mounted upon said supporting member arranged for collective pitch adjustment of said blades about a common transverse axis, said rotor including a yoke member pivotally mounted upon said supporting member for universal support of said rotor about a ball-and-socket assembly fixedly positioned at the intersection of said vertical axis and said transverse axis, control means including an actuating rod movably guided through the ball element of said assembly and pivotally connected to a pair of link sectors for the selective control of the collective pitch of said rotor blades about said transverse axis, and means for tilting said control means about the center of said ball element for the control of the cyclic pitch of said rotor blades about their common transverse axis.

4. In a rotative wing aircraft of the direct lift type, a body, a driven member mounted upon said body for rotation about a generally vertical axis, blade members, supporting means for pivotally mounting said blade members upon said driven member for pivotal movement about a common transverse axis and tilting movements about the intersection of said vertical and transverse axes, a ball-and-socket assembly disposed at the intersection of said axes having its socket portion fixedly supported from said body, the ball portion of said assembly being mounted within said socket portion for tilting movements about the intersection of said axes, collective pitch control means engaging said ball portion for the collective pitch adjustment of said rotor blades about said transverse axis and cyclic pitch control means connected to said ball portion for tilting said rotor blades, said supporting means, and said collective pitch control means for the cyclic pitch adjustment of said rotor blades as they are rotated about said tilted axis.

5. In an aircraft, a body, a supporting member mounted upon said body for rotation about a generally vertical axis, a rotor including a yoke member pivotally mounted upon said supporting member for tilting adjustment of the axis of rotation of said rotor from said generally vertical axis and at least two opposed blades pivotally mounted on said yoke member, an internally threaded ball-and-socket assembly having its center fixedly disposed at the intersection of the axis of the pivotal mounting of said yoke member with said generally vertical axis, blade pitch actuating mechanism including a screw jack operatively interconnecting said pivotally mounted blades with said internally threaded ball-and-socket assembly, manual control means including a rotatable element operatively connected to said screw jack for adjusting said actuating mechanism and the blade interconnection with respect to the center of said ball-and-socket assembly for the collective pitch adjustment of said rotor blades and separate manual control means including a push-pull rod for tilting the ball portion of said ball-and-socket assembly together with said blade pitch actuating mechanism for adjustment of the cyclic pitch control of said rotor blades.

6. In an aircraft including a body, a driven member rotatively mounted about a substantially vertical axis, a ball-and-socket assembly supported from said body concentrically disposed above the body upon said vertical axis, a yoke member pivotally mounted upon said driven member upon a substantially horizontal axis passing through the center of said ball-and-socket assembly upon said vertical axis, and oppositely disposed blades rotatively mounted upon pivotal supports carried by said yoke member, said pivotal supports disposed upon a transverse axis perpendicular to the axis of said yoke pivotal mounting and passing through the center of said ball-and-socket assembly, the improved means for adjusting the collective pitch of said blades about said transverse axis comprising an actuating rod extensible through the ball element of said assembly and connected to a pair of pitch arm elements pivotally connected to said blades, and separate means for tilting said first said means for the cyclic pitch adjustment of said blades.

7. In an aircraft, a body, a driven member rotatively mounted about a substantially vertical axis, a ball-and-socket assembly supported from said body concentrically disposed above the body upon said vertical axis, a yoke member pivotally mounted upon said driven member upon a substantially horizontal axis passing through the center of said ball-and-socket assembly upon said vertical axis, oppositely disposed blades rotatively mounted upon pivotal supports carried by said yoke member, said pivotal supports disposed upon a transverse axis perpendicular to the axis of said yoke pivotal mounting and passing through the center of said ball-and-socket assembly, control means for adjusting the collective pitch of said blades about said transverse axis, separate control means for tilting said first said control means for the cyclic pitch adjustment of said blades, and locking means for conditioning said first control means whereby corrective adjustment of the collective pitch of said blades is automatically accomplished by the cyclic pitch adjustment of said blades by said separate second control means.

8. In an aircraft, a body, a driven member mounted upon said body for rotation about a generally vertical fixed axis, a pair of blade members, supporting means for pivotally mounting said blade members upon said driven member for pivotal movement about a common transverse axis and for tilting movement about the intersection of said vertical and transverse axes, ball-and-socket means disposed at the intersection of said axes having its socket portion fixedly supported from said body, the ball portion of said assembly being rockably mounted within said socket portion for tilting movement about the said intersection of said vertical and transverse axes, pitch control means including a threaded member adjustably engaging said ball portion for the collective pitch adjustment of said rotor blades about said transverse axis, and cyclic pitch control means connected to said ball portion for tilting said ball elements and said collective pitch control means for the cyclic pitch adjustment of said rotor blades.

9. In aircraft, a body, a driven member mounted upon said body for rotation about a generally vertical fixed axis, blade members, supporting means for pivotally mounting said blade members upon said driven member for pivotal movement about a common transverse axis and tilting movements about the intersection of said vertical and transverse axes, means including ball and socket portions disposed at the intersection of said axes having its socket portion fixedly supported from said body, said ball portion being mounted within said socket portion for tilting movements about the said intersection of said axes, said ball portion having internal threads, pitch control means including a screw jack element threadedly engaging said ball portion for the adjustment of the collective pitch of said rotor blades about said transverse axis, and means including a manually controlled push rod connected to said ball portion for tilting said ball portion and said collective pitch control means for the cyclic pitch adjustment of said rotor blades as they are rotated about said generally vertical fixed axis.

10. In aircraft of the rotative blade type including a body, a driven member mounted upon said body for rotation about a normal generally vertical axis, blade members, supporting means for pivotally mounting said blade members upon said driven member for pivotal movement about a common transverse axis and tilting movements about the intersection of said vertical and transverse axes, and a ball-and-socket assembly disposed at the intersection of said axes having its socket portion fixedly supported from said body, the ball portion of said assembly being mounted within said socket portion for tilting movements about the said intersection of said axes, the improvement which comprises collective pitch control means including a second ball-and-socket assembly disposed above said first assembly, means operatively connecting said second assembly with said blades for pitch adjustment and actuating means engaging the ball portions of both said assemblies for the collective pitch adjustment of said rotor blades about said transverse axis by changing the distance between said ball portions and arranged for the tilting movement of said second ball portion away from said normal vertical axis for the cyclic pitch adjustment of said rotor blades for tilting movements as they are rotated about said normal vertical axis.

11. In an aircraft, a body, a driven member rotatively mounted about a substantially vertical axis, a ball-and-socket assembly supported from said body concentrically disposed above said body upon said vertical axis, a yoke member pivotally mounted upon said driven member upon a substantially horizontal axis passing through the center of said ball-and-socket assembly upon said vertical axis, oppositely disposed blades rotatively mounted upon pivotal supports carried by said yoke member, said pivotal supports disposed upon a transverse axis perpendicular to the axis of said yoke pivotal mounting and passing through the center of said ball-and-socket assembly, a second ball-and-socket assembly, links means connecting said second ball-and-socket assembly with said blades, control means including an element movable through said first assembly and terminating in said second assembly for adjusting the collective pitch of said blades about said transverse axis, separate control means for tilting said first control means for the cyclic pitch adjustment of said blades, and means including a latch and a universal joint associated with said first control means, said universal joint operatively connected to said control element for maintaining an operative control connection during said collective pitch adjustment and said latch arranged to lock the said adjustment of said control means with respect to said body whereby corrective adjustment of the collective pitch of said blades by movement of said element through said first assembly is initiated by the concurrent tilting of said first control means and the cyclic pitch adjustment of said blades by said separate second control means.

12. In an aircraft, a body, a driven member rotatively mounted upon said body for rotation about a substantially vertical axis, a ball-and-socket unit supported from said body in a fixed position concentrically disposed above said body upon said vertical axis, a yoke member pivotally mounted upon said driven member upon a substantially horizontal axis passing through the center of said ball-and-socket unit upon said vertical axis, oppositely disposed blades rotatively mounted upon pivotal supports carried by said yoke member, said pivotal supports disposed upon a transverse axis perpendicular to the axis of said yoke pivotal mounting and passing through the center of said ball-and-socket unit, a movable ball-and-socket unit disposed above said fixed unit, link means connecting said movable unit with said blades, means including an articulated push-pull rod assembly having a first terminal attached to said movable unit and an intermediate portion movable through said fixed unit for adjusting the collective pitch of said blades about said transverse axis by causing change in the distance between said units, control means for tilting said first said means for the cyclic pitch adjustment of said blades, and further means for conditioning said first means by fixing the second terminal of said rod assembly to said body whereby corrective adjustment of the collective pitch of said blades is automatically accomplished upon the cyclic pitch adjustment of said blades by said control means.

13. In an aircraft, a body, a driven member rotatively mounted about a substantially vertical axis, a ball-and-socket assembly supported from said body concentrically disposed about the body upon said vertical axis, a yoke member pivotally mounted upon said driven member upon a substantially horizontal axis passing through the center of said ball-and-socket assembly upon said vertical axis, oppositely disposed blades rotatively mounted upon pivotal supports carried by said yoke member, said pivotal supports disposed upon a transverse axis perpendicular to the axis of said yoke pivotal mounting and passing through the center of said ball-and-socket assembly, control means including a push-pull element having a lower terminal adjustably mounted upon said body and its upper terminal operatively connected to said blades for adjusting the collective pitch of said blades about said transverse axis, separate control means for tilting said first control means for the cyclic pitch adjustment of said blades, and means for conditioning said first control means by fixing the lower terminal of said push-pull element to said body arranged to automatically provide corrective adjustment of the collective pitch of said blade.

14. In a helicopter control, a body, a two-bladed rotor mounted upon said body for rotation about a normally vertical axis and for pitch adjustments about a common normally horizontal axis, means for rotating said rotor about said normally vertical axis, control means for adjusting the collective pitch of said rotor blades, further control means operatively connected to said first control means for adjusting the cyclic pitch of said rotor blades, and means including a latchable push-pull rod and a universal joint operatively associated with both said control means for reducing the collective pitch as the cyclic pitch of said rotor is increased to substantially maintain the altitude of the helicopter as such pitch control adjustments are made.

15. In a rotative wing aircraft of the direct lift type, a body, a two-bladed lift rotor rotatively mounted upon said body for rotation about a normally vertical axis, said rotor blades mounted for pitch adjustments about a common normally horizontal axis, means for rotating said rotor about said normally vertical axis, control means including a pair of pivotally interconnected vertically translatable elements operatively associated with said rotor for adjusting the collective pitch of said rotor blades, further control means for increasing the cyclic pitch of said rotor blades about said common horizontal axis, and means operatively associated with both said control means arranged to fix one terminal of one of said vertically translatable elements for automatically reducing the collective pitch as the cyclic pitch of said rotor blades is increased to substantially maintain horizontal flight of the aircraft.

WILL VANDERMEER.

References Cited in the file of this patent

UNITED STATES PATENTS

| Number | Name | Date |
|---|---|---|
| 1,992,015 | Rutherford | Feb. 19, 1935 |
| 2,256,918 | Young | Sept. 23, 1941 |
| 2,383,139 | McGuire | Aug. 21, 1945 |
| 2,439,089 | Hodson | Apr. 6, 1948 |